(12) United States Patent
Yackabonis et al.

(10) Patent No.: US 11,084,222 B2
(45) Date of Patent: Aug. 10, 2021

(54) SYSTEMS AND METHODS FOR DETERMINING DYNAMIC FORCES IN A LIQUEFIER SYSTEM IN ADDITIVE MANUFACTURING

(71) Applicant: Autodesk, Inc., San Rafael, CA (US)

(72) Inventors: William Edward Yackabonis, San Francisco, CA (US); Andreas Linas Bastian, Oakland, CA (US); Peter Joseph Schmehl, Berkeley, CA (US); Joseph Isaac Sadusk, San Francisco, CA (US)

(73) Assignee: Autodesk, Inc., San Rafael, CA (US)

( * ) Notice: Subject to any disclaimer, the term of this patent is extended or adjusted under 35 U.S.C. 154(b) by 339 days.

(21) Appl. No.: 16/022,567

(22) Filed: Jun. 28, 2018

(65) Prior Publication Data
US 2019/0001574 A1    Jan. 3, 2019

Related U.S. Application Data

(60) Provisional application No. 62/527,436, filed on Jun. 30, 2017.

(51) Int. Cl.
*B29C 64/393* (2017.01)
*G06F 3/12* (2006.01)
(Continued)

(52) U.S. Cl.
CPC .......... *B29C 64/393* (2017.08); *B29C 64/118* (2017.08); *B29C 64/209* (2017.08);
(Continued)

(58) Field of Classification Search
None
See application file for complete search history.

(56) References Cited

U.S. PATENT DOCUMENTS

| 5,137,662 A | 8/1992 | Hull et al. |
| 9,120,270 B2 | 9/2015 | Chen et al. |

(Continued)

FOREIGN PATENT DOCUMENTS

WO  WO 2014/126830    8/2014

OTHER PUBLICATIONS

Dendukuri et al., "Continuous-flow lithography for high-throughput microparticle synthesis," Nature Materials, vol. 5, May 2006, pp. 365-369, © 2006 Nature Publishing Group.
(Continued)

*Primary Examiner* — Joseph A Miller, Jr.
(74) *Attorney, Agent, or Firm* — Fish & Richardson P.C.

(57) ABSTRACT

Systems and method for determining dynamic forces in a liquefier system in additive manufacturing include, in at least one aspect of the subject matter described in this specification, a method including: receiving motor data for a drive motor that pushes a solid material toward a liquefaction zone of the liquefier system, wherein the motor data comprises at least one data point per individual command code of a set of command codes sent for additive manufacturing; receiving pressure data associated with the liquefaction zone of the liquefier system, wherein the pressure data includes at least one data point per individual command code of the set of command codes; analyzing the motor data and the pressure data for the set of command codes; and outputting a result of the analyzing to facilitate further 3D printing by the AM 3D printer using the solid material.

18 Claims, 6 Drawing Sheets

(51) Int. Cl.
   *B33Y 10/00* (2015.01)
   *B29C 64/118* (2017.01)
   *B33Y 50/02* (2015.01)
   *B29C 64/209* (2017.01)
   *B33Y 30/00* (2015.01)

(52) U.S. Cl.
   CPC .............. *B33Y 10/00* (2014.12); *B33Y 30/00* (2014.12); *B33Y 50/02* (2014.12); *G06F 3/1206* (2013.01); *G06F 3/1208* (2013.01); *G06F 3/1219* (2013.01); *G06F 3/1253* (2013.01); *G06F 3/1255* (2013.01); *G06F 3/1259* (2013.01); *G06F 3/1244* (2013.01)

(56) References Cited

U.S. PATENT DOCUMENTS

| | | | |
|---|---|---|---|
| 9,205,601 | B2 | 12/2015 | DeSimone et al. |
| 9,211,678 | B2 | 12/2015 | DeSimone et al. |
| 9,216,546 | B2 | 12/2015 | DeSimone et al. |
| 9,360,757 | B2 | 6/2016 | DeSimone et al. |
| 2006/0156978 | A1 | 7/2006 | Lipson et al. |
| 2007/0264481 | A1 | 11/2007 | DeSimone et al. |
| 2008/0192074 | A1* | 8/2008 | Dubois .................. H05K 3/125 347/5 |
| 2010/0028994 | A1 | 2/2010 | DeSimone et al. |
| 2011/0182805 | A1 | 7/2011 | DeSimone et al. |
| 2012/0027285 | A1 | 2/2012 | Shlain et al. |
| 2012/0113457 | A1 | 5/2012 | Pettis |
| 2012/0215352 | A1 | 8/2012 | Eberst |
| 2013/0252178 | A1 | 9/2013 | McLeod et al. |
| 2013/0328228 | A1* | 12/2013 | Pettis .................... B33Y 30/00 264/40.1 |
| 2013/0336884 | A1 | 12/2013 | DeSimone et al. |
| 2014/0107925 | A1 | 4/2014 | Chang et al. |
| 2014/0228860 | A1 | 8/2014 | Steines et al. |
| 2014/0265040 | A1* | 9/2014 | Batchelder .............. G01F 1/661 264/409 |
| 2014/0339741 | A1 | 11/2014 | Aghababaie et al. |
| 2015/0036174 | A1 | 2/2015 | Pettis et al. |
| 2015/0057982 | A1 | 2/2015 | Erdman et al. |
| 2015/0072293 | A1 | 3/2015 | DeSimone et al. |
| 2015/0079327 | A1 | 3/2015 | Kautz et al. |
| 2015/0097315 | A1 | 4/2015 | DeSimone et al. |
| 2015/0097316 | A1 | 4/2015 | DeSimone et al. |
| 2015/0102532 | A1 | 4/2015 | DeSimone et al. |
| 2015/0251356 | A1 | 9/2015 | Batchelder |
| 2015/0328839 | A1 | 11/2015 | Willis et al. |
| 2015/0331402 | A1 | 11/2015 | Lin et al. |
| 2015/0360419 | A1 | 12/2015 | Willis et al. |
| 2016/0067921 | A1 | 3/2016 | Willis et al. |
| 2017/0252819 | A1* | 9/2017 | Gibson .................. B33Y 30/00 |

OTHER PUBLICATIONS

Lambert et al., "Design considerations for mask projection microstereolithography systems," (Jun. 22, 2016) [online] (retrieved from http://sffsymposium.engr.utexas.edu/Manuscripts/2013/2013-09-Lambert.pdf), 20 pages.

Massey, "Permeability Properties of Plastics and Elastomers—A Guide to Packaging and Barrier Materials," Published Jan. 1, 2003. pp. 1-5, 19-29.

Pan et al., "Rapid manufacturing in minutes: the development of a mask projection stereolithography process for high-speed fabrication," Proceedings of the ASME 2012 International Manufacturing Science and Engineering Conferences, Jun. 4-8, 2012, Notre Dame, Indiana, US, 10 pages.

Pinnau and Toy, "Gas and vapor properties of amorphous perfluorinated copolymer membranes based on 2,2-bistrifluoromethyl-4,5-difluoro-1,3-dioxole/tetrafluoroethylene," Journal of Membrane Science, 109:125-133 (1996).

Unknown author, "Teflon™ AF amorphous fluoroplastic resins," (Jun. 22, 2016) [online] (retrieved from https://www.chemours.com/Teflon_Industrial/en_US/assets/downloads/teflon-af-product-information.pdf), 3 pages.

Unknown author, "DuPont™ Teflon® AF amorphous fluoroplastic resin," (Jun. 22, 2016) [online] (retrieved from http://www2.dupont.com/Teflon_Industrial/en_US/assets/downloads/h44587.pdf), 4 pages.

Zhang, "Teflon AF composite materials in membrane separation and molecular recognition in fluorous media," Ph.D. dissertation, University of Pittsburgh, Nov. 2013, 207 pages.

* cited by examiner

SYSTEMS AND METHODS FOR DETERMINING DYNAMIC FORCES IN A LIQUEFIER SYSTEM IN ADDITIVE MANUFACTURING

CROSS-REFERENCE TO RELATED APPLICATIONS

This application claims the benefit under 35 U.S.C. § 119(e) of U.S. Patent Application No. 62/527,436, entitled "SYSTEMS AND METHODS FOR DETERMINING DYNAMIC FORCES IN A LIQUEFIER SYSTEM IN ADDITIVE MANUFACTURING", filed Jun. 30, 2017.

BACKGROUND

This specification relates to components of additive manufacturing systems, including three dimensional (3D) printers, such as Fused Filament Fabrication (FFF) 3D printers.

3D printers employ additive manufacturing techniques, where a product can be built by the addition of materials. Various types of additive manufacturing techniques can be employed, including granular techniques (e.g., Selective Laser Sintering (SLS) and Direct Metal Laser Sintering (DMLS)) and extrusion techniques (e.g., FFF). In addition, various types of 3D printer structures are employed for 3D printing. For example, FFF 3D printers include both Cartesian (xyz) type 3D printers and delta type 3D printers. In typical Cartesian (xyz) type 3D printers, a carriage for a hot end for an extruder, and/or a build platform, is connected with rails that extend in the three different dimensions of printing (x, y & z). In contrast, in typical delta type 3D printers, a carriage for a hot end for an extruder is connected by arms with three rails that extend in only the z direction, and the carriage is moved in three dimensions by independently adjusting the positions of end points of the arms along the three rails. 3D printer extruders have also been affixed to robot arms. In addition, modular 3D printer systems have been proposed, in which exchangeable components can include printheads having different configurations and functionalities.

Furthermore, FFF works by laying down material in layers, e.g., a plastic filament is unwound from a spool and supplies material to produce a part in a preconfigured pattern determined by a model slicing program prior to the act of 3D printing the given model. The model slicing program assigns the motion plan to the 3D printer's firmware which includes speeds, times, direction and the amount of material to add per move. On top of the slicing program, there is often a set of profile parameters unique to each machine and material used in FFF, which provide guidance to the particulars of the limits of the components of the system. This creates a software element corresponding to each material that will be used in the FFF system.

SUMMARY

This specification describes systems and techniques relating to additive manufacturing systems, including 3D printers, such as FFF 3D printers. In general, one or more aspects of the subject matter described in this specification can be embodied in a method for determining dynamic forces in a liquefier system of an additive manufacturing (AM) three dimensional (3D) printer, the method including: receiving motor data for a drive motor that pushes a solid material toward a liquefaction zone of the liquefier system, wherein the motor data includes at least one data point per individual command code of a set of command codes sent to the AM 3D printer; receiving pressure data associated with the liquefaction zone of the liquefier system, wherein the pressure data includes at least one data point per individual command code of the set of command codes sent to the AM 3D printer; analyzing the motor data and the pressure data for the set of command codes sent to the AM 3D printer; and outputting a result of the analyzing to facilitate further 3D printing by the AM 3D printer using the solid material. Further, the method can include receiving temperature data associated with the liquefaction zone of the liquefier system, wherein the temperature data includes at least one data point per individual command code of the set of command codes sent to the AM 3D printer; and the analyzing can include analyzing the motor data, the temperature data, and the pressure data for the set of command codes sent to the AM 3D printer.

The method can include sending the set of command codes to the AM 3D printer, wherein the set of command codes include command codes that vary a speed of deposition by the AM 3D printer in relation to a directed temperature for the liquefaction zone, and the analyzing can include: monitoring the received pressure data during the variation of the speed in relation to the directed temperature; and generating the result as a parameters profile for the solid material used in the AM 3D printer. The outputting can include saving or sending the parameters profile for use in quality control monitoring of a future 3D print, indicating a potential need for maintenance of the 3D printer or a possible problem with the solid material, or a combination thereof. The monitoring can include detecting a pressure variation that indicates loss of material from the liquefaction zone during a transition from a first portion of 3D printing to a second portion of 3D printing, and generating the parameters profile includes specifying different retraction distances for the solid material at different combinations of speed and temperature.

The method can include receiving movement data for the solid material pushed toward the liquefaction zone of the liquefier system, wherein the movement data includes at least one data point per individual command code of the set of command codes sent to the AM 3D printer, and wherein the analyzing includes analyzing the movement data, the motor data, the temperature data, and the pressure data for the set of command codes sent to the AM 3D printer. The monitoring can include monitoring the received pressure data while detecting jams or skips made by the AM 3D printer based on a comparison of the motor data and the movement data for the solid material, and generating the parameters profile can include specifying restrictions on available combinations of extrusion speed and directed temperature in order to prevent jams or skips during 3D printing by the AM 3D printer using the solid material.

The parameters profile for the solid material used in the AM 3D printer can include information regarding a minimum extrusion amount and a maximum number of small extrusions allowed within a set time or a set number of command codes, the method further including using the minimum extrusion amount and the maximum number of small extrusions from the parameters profile as inputs to a slicer program that generates 3D printer command codes for a 3D model to be manufactured using the AM 3D printer. The method can include receiving movement data for the solid material pushed toward the liquefaction zone of the liquefier system, wherein the movement data includes at least one data point per individual command code of the set of command codes sent to the AM 3D printer, and wherein the analyzing includes establishing one or more acceptable ranges of sensor output values for a 3D object to be manufactured using the material with the AM 3D printer, the method further including: monitoring motor data, temperature data, solid material movement data, and pressure data during manufacturing of the 3D object using the material with the AM 3D printer; comparing the monitored data with the one or more acceptable ranges of sensor output values; identifying the 3D object as having been correctly manufactured using the material with the AM 3D printer when the monitored data comes within the one or more acceptable ranges of sensor output values; and identifying a potential print failure for the 3D object manufactured using the material with the AM 3D printer when the monitored data does not come within the one or more acceptable ranges of sensor output values.

The analyzing can include establishing an acceptable range of the pressure data for at least two different operating temperatures, the method further including: monitoring motor data, temperature data, and pressure data during manufacturing of a 3D object using the material with the AM 3D printer; comparing the monitored pressure data with the acceptable range of the pressure data in accordance with the monitored temperature data to detect an impending jam; and adjusting an aspect of the manufacturing of the 3D object using the material with the AM 3D printer to avoid the impending jam. The adjusting can include changing a speed of the manufacturing of the 3D object. The adjusting can include performing a purge of the material in the liquefier system to normalize pressure levels.

One or more aspects of the subject matter described in this specification can also be embodied in an extruder for an additive manufacturing (AM) three dimensional (3D) printer including: a liquefier channel having a liquefaction zone for the extruder; a drive motor configured to push a material toward the liquefaction zone of the liquefier channel; a mount configured and arranged to connect the liquefier channel with a motion system of the AM 3D printer; one or more heaters coupled with the liquefier channel; a temperature sensor proximate the liquefaction zone and configured to provide temperature data; a nozzle coupled with the liquefier channel to provide an exit orifice for the material; and a load sensor configured and arranged to measure displacement force between the drive motor and the nozzle.

The extruder can include a movement sensor configured to detect the material being pushed toward the liquefaction zone of the liquefier channel. The movement sensor can include a rotary encoder configured and arranged to contact the material including a solid filament. The nozzle can be fixedly attached with the mount, and a drive gear of the drive motor can be coupled with the mount through the load sensor, thereby allowing the drive gear of the motor to be at least partially displaced relative to the mount during operation of the extruder. The one or more heaters can include a resistive heater that forms the liquefaction zone upstream of the nozzle and can be configured to liquefy the solid material before extrusion The temperature sensor can include a thermocouple or a thermistor.

The extruder can include an associated computer-readable medium encoding instructions configured to cause a processor to (i) monitor motor data for the drive motor, temperature data from the temperature sensor, and pressure data from the load sensor during manufacturing of a 3D object using the material with the AM 3D printer, (ii) compare at least a portion of the monitored data with at least one range of acceptable data established for the material with the AM 3D printer, and (iii) adjust an aspect of the manufacturing of the 3D object using the material with the AM 3D printer based on a deviation of the portion of the monitored data from the at least one range of acceptable data. The portion of the monitored data can include monitored pressure data, the at least one range can include an acceptable range of the pressure data for at least two different operating temperatures, the associated computer-readable medium encoding instructions can be configured to cause the processor to compare the monitored pressure data with the acceptable range of the pressure data in accordance with the monitored temperature data to detect an impending jam, and the medium encoding instructions can be configured to cause the processor to adjust the aspect of the manufacturing of the 3D object using the material with the AM 3D printer to avoid the impending jam.

The associated computer-readable medium encoding instructions can be configured to cause the processor to adjust the manufacturing of the 3D object by changing a speed, a directed temperature, or both, for the manufacturing of the 3D object. The associated computer-readable medium encoding instructions can be configured to cause the processor to adjust the manufacturing of the 3D object by performing a purge of the material in the liquefier channel to normalize pressure levels. Further, the associated computer-readable medium encoding instructions can be configured to cause the processor to perform other method operations, as described herein.

In addition, one or more aspects of the subject matter described in this specification can also be embodied in a non-transitory computer-readable medium encoding instructions that cause a data processing apparatus associated with a liquefier system of an additive manufacturing (AM) three dimensional (3D) printer to perform operations including: receiving motor data for a drive motor that pushes a solid material toward a liquefaction zone of the liquefier system, wherein the motor data include at least one data point per individual command code of a set of command codes sent to the AM 3D printer; receiving temperature data associated with the liquefaction zone of the liquefier system, wherein the temperature data includes at least one data point per individual command code of the set of command codes sent to the AM 3D printer; receiving pressure data associated with the liquefaction zone of the liquefier system, wherein the pressure data includes at least one data point per individual command code of the set of command codes sent to the AM 3D printer; analyzing the motor data, the temperature data, and the pressure data for the set of command codes sent to the AM 3D printer; and outputting a result of the analyzing to facilitate further 3D printing by the AM 3D printer using the solid material.

The non-transitory computer-readable medium can also encode instructions that cause the data processing apparatus to perform operations including sending the set of command codes to the AM 3D printer, wherein the set of command codes include command codes that vary a speed of deposition by the AM 3D printer in relation to a directed temperature for the liquefaction zone, and the analyzing can include: monitoring the received pressure data during the variation of the speed in relation to the directed temperature; and generating the result as a parameters profile for the solid material used in the AM 3D printer. Moreover, the non-transitory computer-readable medium can also encode instructions that cause the data processing apparatus to perform other method operations, as described herein.

Particular embodiments of the subject matter described in this specification can be implemented to realize one or more of the following advantages. The dynamic forces on a liquefier system in a 3D printer can be quantified and correlated with each other to improve additive manufacturing processes. Profiles of material properties (e.g., for specific combinations of materials used with a particular 3D printer) can be created to inform and improve future additive manufacturing using each specific material with the particular 3D printer. Improvement can be made in the generation of the tool path data (e.g., slice planning and generation of G-code). Moreover, the profiles can be used for real-time adjustment of 3D printer operations during a 3D print, validation of the 3D print, or both, as well as for assisting in 3D printer maintenance and upgrades.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
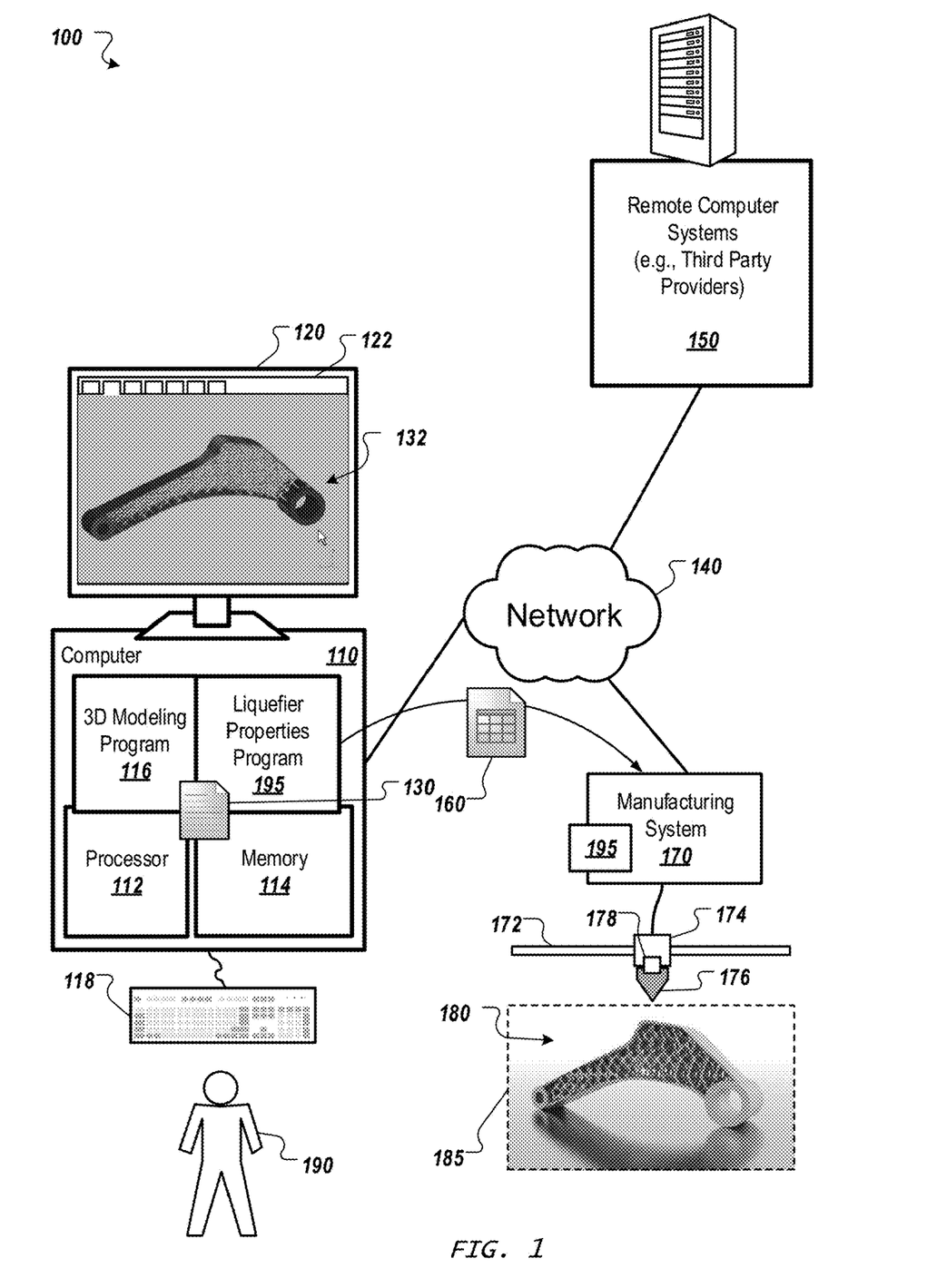
FIG. 1 shows an example of a system to design and manufacture objects using additive manufacturing systems and techniques including determining dynamic forces of a liquefier system, in relation to the properties of one or more materials to be melted, to facilitate the additive manufacturing.

FIG. 1 shows an example of a system 100 to design and manufacture objects using additive manufacturing systems and techniques including determining dynamic forces of a liquefier system, in relation to the properties of one or more materials to be melted, to facilitate the additive manufacturing. A computer 110 includes a processor 112 and a memory 114, and the computer 110 can be connected to a network 140, which can be a private network, a public network, a virtual private network, etc. The processor 112 is one or more hardware processors, which can each include multiple processor cores. The memory 114 can include both volatile and non-volatile memory, such as Random Access Memory (RAM) and Flash RAM. The computer 110 can include various types of computer storage media and devices, which can include the memory 114, to store instructions of programs that run on the processor 112.

Such programs can include a 3D modeling program 116, which can run locally on computer 110, remotely on a computer of one or more remote computer systems 150 (e.g., one or more third party providers' one or more server systems accessible by the computer 110 via the network 140), or both. The 3D modeling program 116 presents a user interface (UI) 122 on a display device 120 of the computer 110, which can be operated using one or more input devices 118 of the computer 110 (e.g., keyboard and mouse). Note that while shown as separate devices in FIG. 1, the display device 120 and/or input devices 118 can also be integrated with each other and/or with the computer 110, such as in a tablet computer.

A user 190 can interact with the 3D modeling program 116 to create a 3D model 132. This can be done using known graphical user interface tools. In the example shown, the 3D model 132 is a bracket that includes an internal lattice structure to improve strength and reduce weight, but such a structure is not required. Rather, various suitable forms of 3D model 132 can be created to represent a wide variety of 3D objects that can be manufactured, such as by using additive manufacturing systems and techniques. In various implementations, the 3D modeling program 116 is programed to provide various user interface elements to enable the user 190 to design the 3D model 132, specify materials and loading cases, perform simulation, etc.

Once the user 190 is satisfied with the model 132, the 3D model 132 is stored as a document 130 and/or used to generate another representation of the model (e.g., an .STL file for additive manufacturing). This can be done upon request by the user 190, or in light of the user's request for another action, such as sending the 3D model 132 to a manufacturing system 170, which can be directly connected to the computer 110, e.g., integrated with the computer 110, or connected via the network 140, as shown. This can involve a post-process carried out on the local computer 110 or a cloud service to export the 3D model 132 to an electronic document from which to manufacture. Note that an electronic document (which for brevity will simply be referred to as a document) can be a file, but does not necessarily correspond to a file. A document may be stored in a portion of a file that holds other documents, in a single file dedicated to the document in question, or in multiple coordinated files. In any case, the 3D modeling program 116 is used to create the 3D model 132 and generate a document 160 (of an appropriate format) for use by the manufacturing system 170 to coordinate its manufacturing activities to create a 3D object 180 corresponding to the 3D model 132.

The manufacturing system 170 includes a 3D motion system 172 that moves at least one carriage 174 to operate an attached tool 176 in a build space 185 to create the 3D object 180. Note that although shown in FIG. 1 as a simple linear system, in typical implementations, the 3D motion system 172 operates in more than one dimension (e.g., a Cartesian (xyz) type 3D printer motion system or a delta type 3D printer). Further, in some implementations, the 3D motion system 172 moves the carriage 174 in relation to a tool rack to change from using one tool to another tool. Various types of tools (both additive manufacturing and subtractive manufacturing tools for computer aided manufacturing) can be used by the system 170, but at least one tool 176 is an extrusion tool with at least one liquefier chamber.

In addition, the system 170 includes sensors 178 that provide data, which is processed to determine the dynamic forces on a liquefier system of the extrusion tool 176. In some implementations, the sensors 178 monitor pressure, temperature, timing and flowrate within the liquefier system per line of command code (e.g., per line of G-code) as instructed by a slicer program, which can be separate from or integrated into the 3D modeling program 116, and which generates tool path instructions in the document 160. Note that a "program" need not be a standalone program, but rather can be a procedure within another program.

In any case, a liquefier properties program 195 collects and processes the data from the sensors 178 (e.g., at the point of the motor driving a filament through the liquefaction zone) in order to improve the operation of the additive manufacturing (e.g., to minimize the tolerance stack of the overall system 100). In some implementations, the liquefier properties program 195 is integrated with the 3D modeling program 116, into the slicer program, or both. In some implementations, the liquefier properties program 195 is a standalone program that communicates with the manufacturing system 170, the 3D modeling computer 110, or both.

Moreover, the manufacturing system 170 can include a computer with processor(s) and memory (like computer 110) that runs the liquefier properties program 195. The liquefier properties program 195 can be implemented in the firmware of a 3D printer 170, or the liquefier properties program 195 can be implemented in separate firmware (e.g., for the extruder 176) that communicates with the firmware of the 3D printer 170. In some implementations, the liquefier properties program 195 can run on a computer at the remote system 150. In some implementations, the liquefier properties program 195 has components operating on more than one of these computers (e.g., a component on each of the computer 110 and the manufacturing system 170, as shown).

In any case, the liquefier properties program 195 can operate on a computer in the system 100 (e.g., computer 110, a computer at the remote system 150, or a computer in the system 170) to create a properties profile for at least one extrusion material used in the manufacturing system 170 (e.g., including flow rate and temperature limits). The properties profile can then be used to inform and improve future additive manufacturing using that extrusion material in the system 170. Improvement can be made in slice planning and G-code generation (i.e., the liquefier properties program 195 can assist in generating the document 160). Moreover, the profile can be used for real-time adjustment of 3D printer operations during a 3D print (e.g., using a closed loop sensor system), validation of the 3D print, or both, as well as for assisting in 3D printer maintenance and upgrades.

By developing a detailed understanding of how a specific material interacts with a liquefaction system of an extruder tool 176, the 3D prints can be improved by helping to prevent printing errors (which cause the printed object 180 to be flawed) caused by any number of anomalies (e.g., geometry, material, size of a nozzle's exit orifice, or environment considerations) that arise for a given 3D print. In some cases, adjusting the slicing of the model 132 (for future prints) based on the analyzed system data is sufficient to reduce or prevent 3D printing errors. In some cases, the information about the material in the liquefier system is used to adjust the operation of the system 170 dynamically to reduce or prevent 3D printing errors. In some cases, data acquired using the sensors 178 during a 3D print is compared to the previously acquired profile information to validate that the current print doesn't include a 3D printing error. Moreover, a set of one or more profiles generated for one or more materials used in the system 170 can serve as a baseline for comparison when the system 170 is cleaned, rebuilt, or modified (e.g., by replacing a heater with a newer model) in order to facilitate identification of problems resulting from the change to the system 170.

Figure 2:
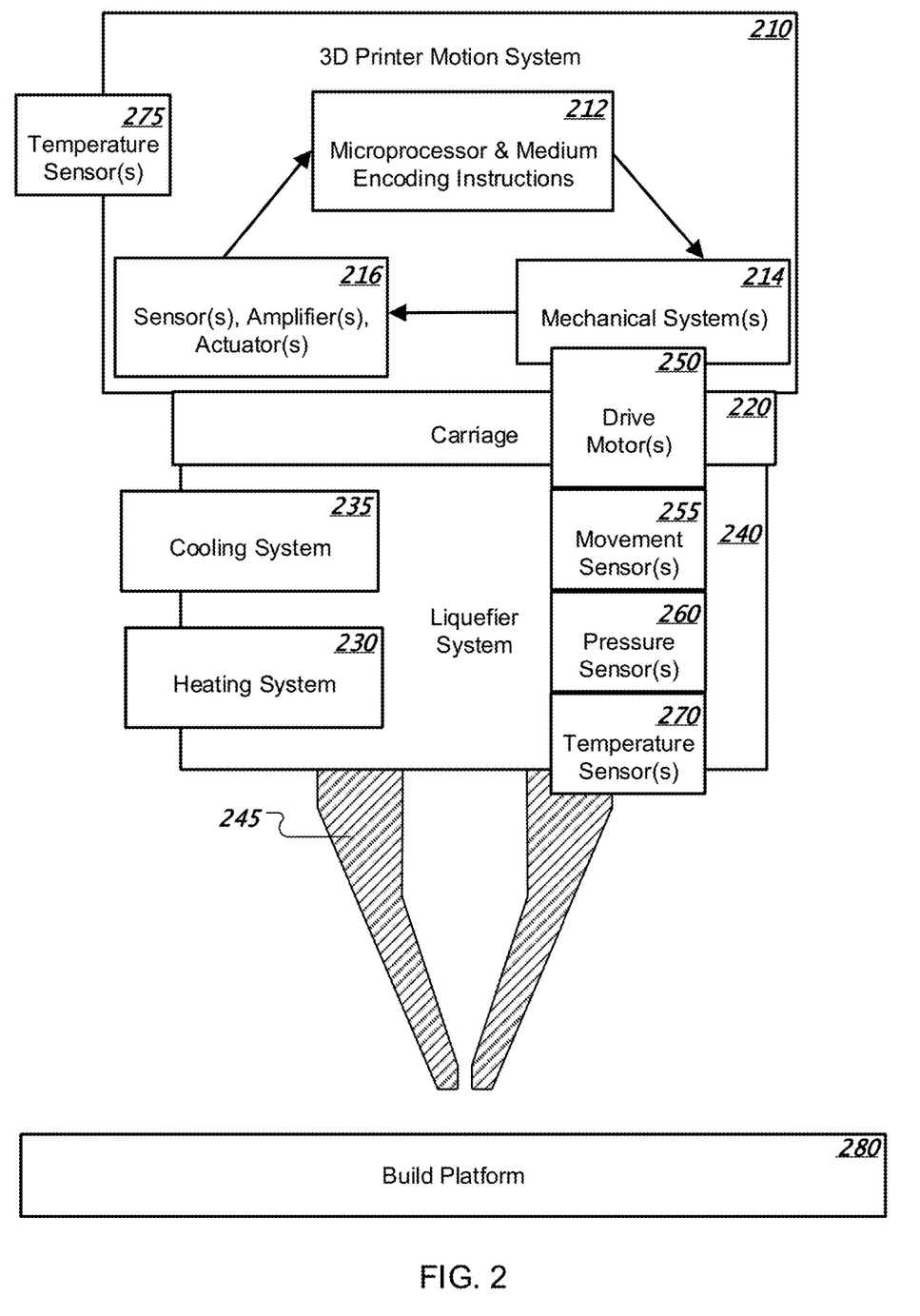
FIG. 2 is a block diagram showing an example of an extruder assembly over a build platform.

FIG. 2 is a block diagram showing an example of an extruder assembly over a build platform. The extruder assembly represents various types of 3D printers, and while the specific structures are different in different types of 3D printers, each 3D printer includes a 3D printer motion system 210. The 3D printer motion system 210 operates to move a carriage 220 (and thus the hot end) in relation to the 3D build volume in relation to a build platform 280. Thus, the 3D printer motion system 210 can include at least one controller and an input/output (I/O) subsystem.

In some implementations, the 3D printer motion system 210 includes at least one processor and medium encoding instruction 212 (e.g., a microprocessor with embedded firmware), one or more mechanical systems 214 (e.g., to physically move the carriage 220, the build platform 280, or both), and one or more sensor(s), amplifier(s), and actuator(s) 216. Thus, the 3D printer motion system 210 can be a mechatronic system, which monitors the build environment and/or the 3D printer using sensors, and processes the sensor information in order to change the behavior of the system so as to react to changes in the build environment and/or the 3D printer itself. In this case, the encoded instructions (e.g., software, firmware, application specific integrated circuits (ASICs), or a combination thereof) has become an integral element of the 3D printer, allowing the 3D printer to identify and react to situational changes that can occur during 3D printing.

In some implementations, the 3D printer motion system 210 includes one or more portions of the extruder. For example, the system 210 can include the filament drive motor 250. In any case, the 3D printer motion system 210 causes movement of the carriage 220 (and thus the hot end) in relation to the build volume, and these motions are coordinated with the melting and extruding done at the hot end. Further, in some implementations, the hot end tool attaches to the carriage 220 (and thus the 3D printer motion system 210) through a connector, which can be one or more of various types of mechanical connectors, which may or may not include locking mechanisms.

The hot end includes a liquefier system 240, which includes at least a portion of a heating system 230. For example, the heating system 230 can include an electric resistive heater, a Peltier device, or a combination of these. The liquefier system 240 can also include at least a portion of a cooling system 235 (e.g., air cooled, liquid cooled, or both). For example, the cooling system 235 can include a heat sink and a cooling delivery system (e.g., air ducting for blown air, one or more fans, one or more heat pipes, or a combination of these) for cooling the heat sink and a nozzle 245 and/or the material dispensed by the nozzle 245. In addition, although the heating system 230, the cooling system 235, and the liquefier system 240 are shown as distinct boxes in the schematic of FIG. 2, it will be appreciated that these structures can be integrated and overlap with each other in various ways.

The liquefier system 240 includes a material delivery channel (e.g., defined by a filament guide tube and a thermal barrier, or defined by a barrel for pellets of material in an auger-based system) that connects the nozzle 245 with the upstream components. Note that in some implementations, a 3D printer can be designed to have as little coupling between the heater and the heat sink as possible; the heat sink is included to help remove undesirable heat that travels up to the region above where liquefaction of the extrusion material happens. The liquefier system 240 includes a movement sensor 255, which provides data regarding the actual movement of the unmelted extrudate (e.g., a filament) traveling into the liquefaction zone. In addition, the liquefier system 240 includes one or more pressure sensors 260, which provide data regarding the pressure level within the liquefaction zone.

The liquefier system 240 includes one or more temperature sensors 270, which provide temperature data for the liquefaction zone (within and upstream of the nozzle 245) and the extrusion material therein. In some implementations, the system includes one or more temperature sensors 275, which provide temperature data for the environment (e.g., ambient air temperature). In some implementations, the temperature sensor(s) 275 are part of the extruder assembly, e.g., attached to the 3D printer motion system 210. In some implementations, the temperature sensor(s) 275 are located elsewhere in the 3D printing system.

In any case, data is collected from various sensors and potentially other components of the extruder for use in characterizing the dynamic forces affecting the liquefier system 240 during 3D printing operations. In some implementations, data is collected from the drive motor(s) 250 (e.g., from the motor or from the motor controller, and correlated with G-code), the movement sensor(s) 255, the pressure sensor(s) 260, and the temperature sensor(s) 270, both for analysis purposes to adjust future prints and for active monitoring of in-progress 3D printing of an object. As will be appreciated, various numbers of these components can be included in various possible structural arrangements in different implementations.

Figure 3A:
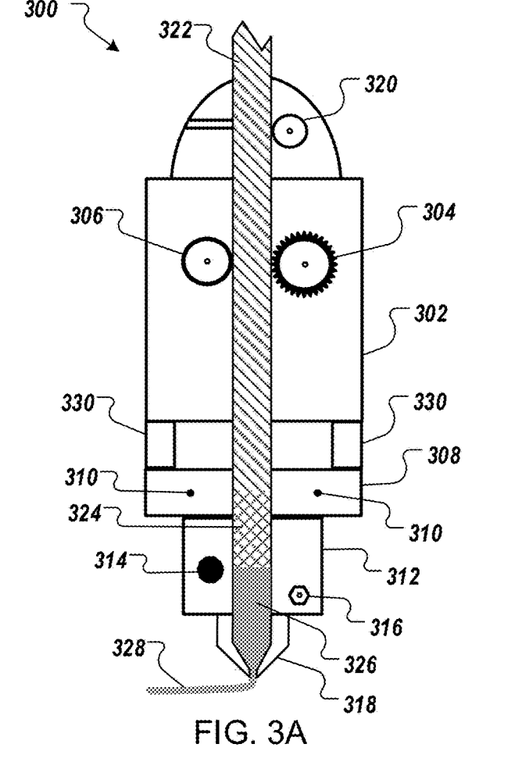
FIG. 3A shows another example of an extruder assembly.

FIG. 3A shows another example of an extruder assembly 300. The extruder assembly 300 has a drive motor 302, with one or more drive gears, such as a pinch wheel/gear 304 and a tensioning wheel 306, that hold a filament 322 and drive the filament 322 into a liquefaction zone of the extruder assembly 300. As shown, the filament 322 is in solid form when driven by the motor 302, and then the filament 322 begins to melt 324 as it crosses its glass transition temperature in a first region, and the filament 322 is fully melted 326 in a second region before it is extruded from a nozzle 318 to form an extruded bead 328 of melted material.

In order to assess the pressure within the liquefaction zone of the extruder assembly 300, one or more load sensors 330 are attached between the drive gear(s) of the motor 302 (note that drive gears can be separated from their motor by a number of different mechanical structures) and a carriage 308 (or a block that is attached to the carriage), which includes attachment locations 310 used to mount the carriage 308 to the 3D motion system of the 3D printer (e.g., to a gantry in a Cartesian (xyz) type 3D printer). Other types of sensor technologies can be used to obtain pressure data for the liquefaction zone, such as piezoresistive, capacitive, electromagnetic, piezoelectric, optical, potentiometric, resonant or thermal sensors, but load sensors can be of particular use since their costs are comparatively low, and such sensors can provide good data that accurately represents pressure within the liquefaction zone. In the example shown, the nozzle 318 is fixed relative to the carriage 308, but the motor 302 (or a drive gear therefor) is allowed to "float" (i.e., the motion response of the motor 302 relative to the carriage 308 will be dynamic) and thus the load sensors 330 connecting the motor's drive gear to the carriage 308 provide data corresponding to the force needed to push the filament 322 into the liquefaction zone. In general, by capturing the load between mechanical structures lying between (or including) a drive gear of the motor 302 and the nozzle 318, a data signal for the load on the filament 322 can be obtained as it is pushed into the liquefaction zone, and this load on the filament represents the pressure in the liquefaction zone of the extruder assembly 300.

Further, as a validation signal for the motor data, a movement sensor 320 (e.g., a rotary encoder or an optical sensor) can be included in the extruder assembly 300 for use in verifying that the commands sent to the motor 302 actually result in movement of the filament 322. In some implementations, the volume or weight of an extruded signal and a set of commands yielding a specific geometry can also serve as a validation technique. Note that in some implementations, the signal to the motor 302 can be used in addition to, or as an alternative to the data collected by a movement sensor 320. In addition, the extruder assembly 300 includes a heating block 312, which includes a heating element 314 to form the liquefaction zone. Also included in the heating block 312 is a thermocouple 316 (or thermistor or other temp measuring device) that provides temperature data, e.g., for use in control of the heating element 314. Capturing this data for analysis provides detailed information regarding the temperature of the extruder assembly 300 during operation.

Figure 3B:
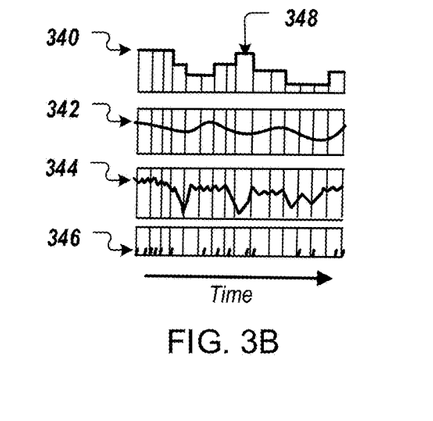
FIG. 3B shows an example of data collected for each line of 3D printer command code.

The control signal provided to the motor 302 (e.g., the control signal provided to a stepper motor for the filament drive mechanism) is also captured for use in analyzing the operation of the extruder assembly 300. FIG. 3B shows an example of data collected for each line of 3D printer command code. FIG. 3B shows examples of motor drive data 340 (e.g., the drive signal sent to a stepper motor 302), temperature data 342 (e.g., from a thermocouple 316), pressure data 344 (e.g., from load sensors 330), and material movement data 346 (e.g., from a rotary encoder 320). These data 340, 342, 344, 346 are plotted against time in FIG. 3B, and more specifically against each line of command code 348 (e.g., G-code) sent to the 3D printer when manufacturing an object, and are provided to an analyzer program (e.g., the liquefier properties program 195).

The data 340, 342, 344, 346 are all aligned in time and provide output information regarding temperature, pressure, motor operation and the material movement, in step with each other, and per each individual, single line of command code sent to the 3D printer. By collecting and analyzing this data over multiple 3D printing runs, detailed profile information can be developed to facilitate the operation of the 3D printer. The motor drive data 340 enables evaluation of the firmware and electronics of the 3D printer. For example, time delays between the issuance of a command to the 3D printer's controller and the receipt of a movement instruction by the drive motor reveals details of the operation of the 3D printer's firmware and electronics, including how the printer commands are manipulated by the 3D printer's controller in the course of executing the command.

The material movement data 346 (e.g., from a rotary encoder 320) enables evaluation of the mechanical systems and software of the 3D printer. For example, in addition to detecting skips and jams in the 3D printer's operation, precursor events to such skips and jams (e.g., minor slippage that precedes a major jam) can be detected and then avoided. The temperature data 342 (e.g., from a thermocouple 316) enables evaluation of the material (e.g., filament 322) being melted, operation of the heating system of the extruder assembly, and the 3D printer firmware that controls the melting process. For example, latency between a temperature command change and the actual change in temperature can reveal details regarding interactions between the heating system of the extruder assembly and the 3D printer's firmware and electronics. The pressure data 344 (e.g., from load sensors 330) enables evaluation of the interactions of the mechanical, thermal, and material delivery systems of the 3D printer. In addition, note that the resolution of the temperature and pressure data 342, 344 will typically be higher than that of the motor drive and filament movement data 340, 346, but the different sets of data can readily be aligned and correlated with the command codes issued to the 3D printer.

Figure 3C:
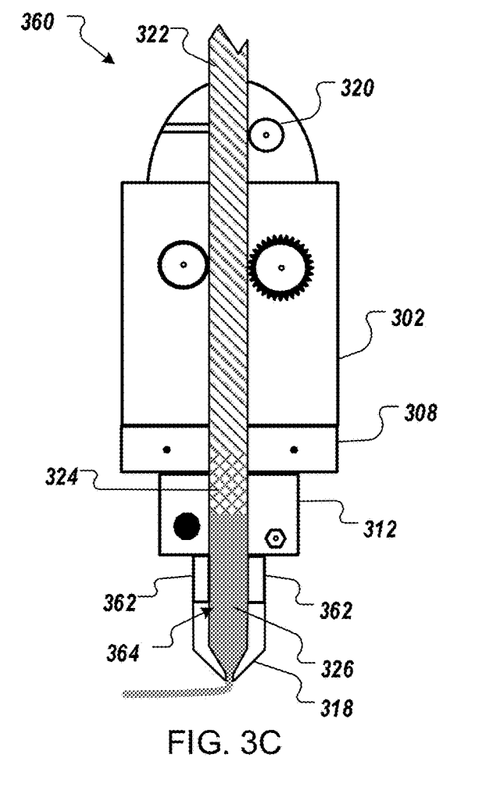
FIG. 3C shows yet another example of an extruder assembly.

The data 340, 342, 344, 346 are referenced as coming from the components of the extruder assembly 300 shown in FIG. 3A. However, as will be appreciated, many variations in the components of an extruder assembly, and structural arrangement thereof, are possible, while still providing the data 340, 342, 344, 346 to be analyzed. For example, rather than having the drive motor float, as shown in FIG. 3A, the nozzle can be allowed to float. FIG. 3C shows an example of an extruder assembly 360 in which most of the components are the same as those in the extruder assembly 300. However, in this example, the motor 302 is fixed relative to the carriage 308, and the nozzle 318 is allowed to float.

Thus, in the extruder assembly 360, one or more load sensors 362 are attached between the nozzle 318 and the heating block 312, which is in turn fixedly attached to the carriage 308. Since the nozzle 318 is allowed to float (i.e., the motion response of the nozzle 318 relative to the carriage 308 will be dynamic) the load sensors 362 connecting the nozzle 318 with the carriage 308 (through the heating block 312) provide data corresponding to the force needed to push the filament 322 into the liquefaction zone. In such implementations, a liquefaction zone 364 can be made larger to account for displacement of the sensors 362, providing more room for the fully melted material 326 after the partially melted material 324.

This can result in more heat being required for the larger liquefaction zone 364, and also potentially undesirable impacts on the consistency of the material extrusion by the 3D printer. In light of this, it may be preferable to use an extruder assembly configuration that ensures all components below the mounting locations 310 are fixedly attached and maintain a constant geometry/volume during 3D printing. In addition, note that the load sensors 330 and rotary encoder 320 can be readily added to existing extruder assemblies without introducing any spacers or impacting the thermal dynamics of the extruder for the melting and extrusion of the printing material. Thus, the detailed sensor data can be collected in a non-invasive manner, which doesn't disrupt the dynamics of the heating and material flow through the extruder assembly.

Figure 3D:
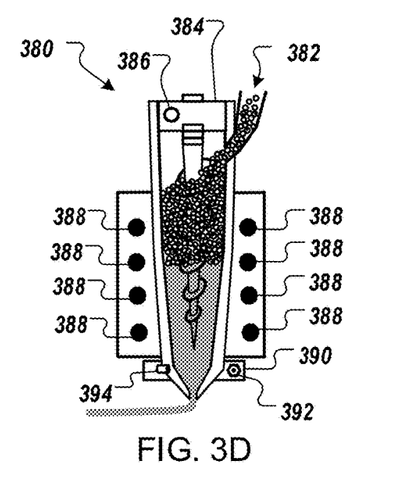
FIG. 3D shows an example of an auger-based extruder assembly.

Other extruder assembly structures are also possible. For example, the drive motor 302 can be fixed, but the drive motor 302 can also impact force via a flexible coupling to a drive gear assembly 304, 306 that floats. As another example, FIG. 3D shows an auger-based extruder assembly 380. The auger-based extruder assembly 380 includes a feed system 382 to provide pellets of material (e.g., plastic polymer) through the jacket and into the barrel of the extruder assembly 380. A drive motor 384 rotates the auger to push the pellets into the liquefaction zone for melting and extrusion, and the control signals sent to the auger drive motor 384 are also provided as output motor drive data 340.

In addition, a torque sensor 386 for the motor 384 measures the resistance of the pellets inside the barrel, thus providing material movement data 346. In some implementations, a sensor can be used in the feed system 382 to measure the flow of pellets into the barrel. One or more heating elements 388 wrap around the barrel and liquefy the pellets inside the barrel, as shown. In addition, the auger-based extruder assembly 380 can include a heating cuff 390 with a thermocouple 392 (to provide temperature data 342) and a pressure sensor 394 in the wall of the barrel (to provide pressure data 344). In some implementations, the pressure sensor 394 provides data regarding pressure near the nozzle exit orifice, and this data is combined with data from the torque sensor 386 (to balance the force equation) to generate the pressure data 344. In some implementations, one or more load sensors can be used to generate pressure data 344 for the auger-based extruder assembly 380 (e.g., load sensors positioned between the motor 384 and the barrel of the auger).

As will be appreciated, many variations of these extruder assembly structures are possible, and depending on the particular system, additional data can be collected for analysis. For example, some implementations include a metal wire electron beam or laser system, where a metal rod 322 is pulled from a wire feed spool driven through a pre-heater 312 before being fully melted (just after extrusion) by a focused laser beam (i.e., the melt zone is outside the exit orifice of the extruder). In such implementations, the intensity of the power output to melt the metal wire (e.g., a sensor built into the laser system) can be included as data input the analysis program. As another example, the electricity drawn by a MIG (Metal Inert Gas) wire feed additive manufacturing system (which employs an arc welding technique in which the electric current is provided by the filler metal wire, which is cooled and shielded from the access of air by a stream of chemically inert gas) can be included as data input the analysis program.

Figure 4:
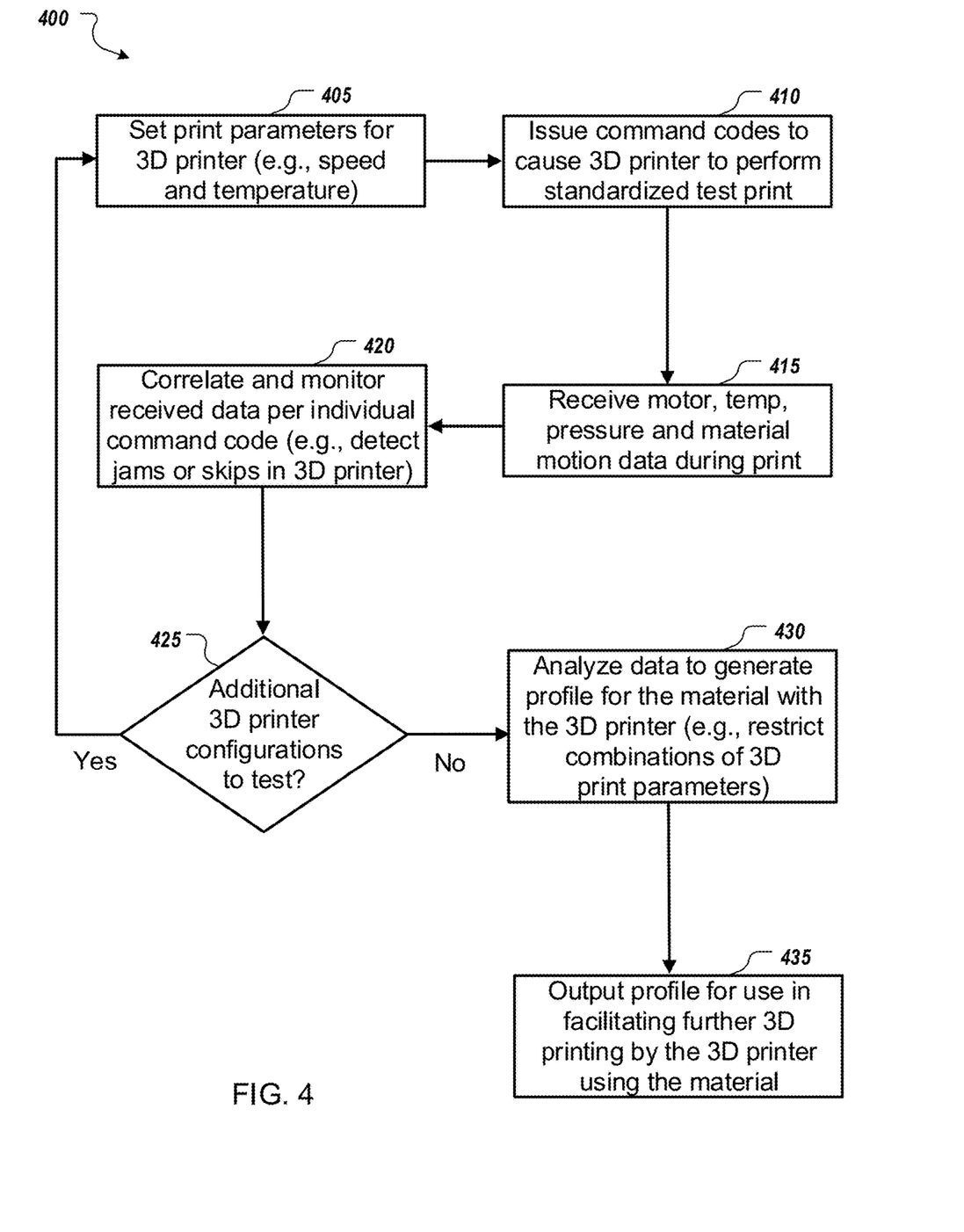
FIG. 4 shows an example of a process of creating a profile for a 3D print material to facilitate additive manufacturing.

FIG. 4 shows an example of a process 400 of creating a profile for a 3D print material to facilitate additive manufacturing. One or more print parameters (e.g., speed and temperature) are set 405. In various implementations, the settings for the 3D printer can include the extruder temperature at different parts of print, cooling level (e.g., percentage of fan power), cooling timing and location (e.g., when the fan is on, and when the fan is blowing on extruded material), print speeds at different times in prints, deposition layer heights above previous layer or build platform, filament diameter setting (which affects amount of filament extruded for given distance of travel), retraction distance and retraction speed, build environment temperature, build platform temperature, and aperture size of nozzle. Other parameters that can be set for the test print(s) in order to profile the material on the 3D printer can include line spacing, perimeter overlap ratio, minimum time between starting the next layer, extrusion rate modifiers or ratios, layer thickness, minimum extrusion rate, lay thickness, or combinations thereof.

Once the print parameters are set, command codes (e.g., G-code) are issued 410 to cause the 3D printer to perform a standardized test print. The test print operation can include various types of extrusions, including different combinations of short extrusions and long extrusions over varying distances, as different types of retractions. For example, the testing operations can include performing multiple retractions over varying amounts of flow rates. Various types of test prints can be used, depending upon which print parameters and 3D printer responses are to be discovered. For example, one or more motor load tests can be used to identify conditions preceding a jam or skip. As another example, one or more pressure relaxation tests can be used to identify a proper amount of material retraction between separated portions of a 3D print. One or more motor load tests can be used to identify conditions preceding a minimum or maximum extrusion rate. One or more motor load tests can be used to identify conditions for optimal printing—position of least pressure in the working system. As another example, one or more pressure relaxation tests can be used to identify a proper amount of time need between separated portions of a 3D print. As another example, one or more pressure relaxation tests can be used to identify a proper amount of distance allowed between separated portions of a 3D print.

Motor data, temperature data, pressure data and material motion data are received 415 during the test print (both when the material is being extruded and when the material is not being extruded). In some implementations, the pressure data comes from one or more load cells, so the data pressure inside the liquefier is inferred from the force the motor is applying to push the material through the liquefier. In some implementations, the material motion data comes from a rotary encoder (or other sensor that measures the distance a filament has travelled), and the motor data comes from the step pulses coming from the controller of the motor, as described above. Moreover, in some implementations, comparing the material motion data with the motor data shows the expected versus real motion, which provide significant insight into the 3D printer's operation.

The received data is correlated and monitored 420 per individual command code (i.e., one or more data points from each sensor per individual command code). For example, the sampling rate for the sensor data can be 5 kHz in the analog domain and 500 KHz in the digital domain. In addition, note that the data capture system should synchronize the different data sets, such as by syncing time stamps for events between all the different data sources and matching those time stamps up to commands from the test print. In this manner, when the analysis of the data is performed, a specific command from the set of commands can be selected, and the synchronization of the data ensures that all data obtained for the selected command actually correspond to events pertaining to that command. In some implementations, the sampling and analysis is performed in real time, in which case, there may be no need for time stamps. In some implementations, the data can be stored and trends can determined using different types of analysis systems and techniques, including machine learning. The results of such analysis can then be used to analyze and change toolpaths in future slicing software.

The received pressure data can be monitored while detecting jams or skips made by the 3D printer based on a comparison of the motor data and the material motion data. In some implementations, the monitoring 420 includes detecting a pressure variation (e.g., a drop in pressure and/or a rate of the pressure returning to a normal level after such a drop) that indicates loss of material from the melt zone during a transition from a first portion of the test print to a second portion of the test print. Such data can be used to optimize retraction distances.

Once the test print is completed, a check 425 is made to see if there are additional 3D printer configurations to test. This can include running through a series of predefined tests as well as eliminating or adding tests to be performed based on the results of initial one or more initial tests. If there remain additional 3D printer configurations to test at 425, one or more of the print parameters are set 405 differently, and this portion of the process 400 repeats. For example, a set of command codes can be sent 410 to the 3D printer during this portion of the process 400 that vary a speed of deposition by the 3D printer in relation to a directed temperature for the melt zone of the liquefier. As another example, performing multiple print tests while running the 3D printer at different temperatures and also monitoring the pressure (e.g., during retraction of the material) enables identification of different combinations of speeds and command codes that are likely to result in skips or jams. In general, comparing the received data during the testing operations allows detection of undesirable printing events, such as skips and jams, and correlating this data with each other and the command codes allows determination of a safe printer parameter space as well as determination of other preferred aspects of running the 3D printer.

Once the various printer configurations have been tested, the collected data is analyzed 430 to generate a parameters profile for the material being used with the 3D printer. For example, restrictions on available combinations of speed and temperature (as can be directed by a user) can be specified in order to prevent jams or skips during future 3D printing activities using this material with this 3D printer. If certain condition thresholds are met, then the printer can be signaled to follow a procedure to mitigate potential jam conditions. Procedures can include temperature changes, print speed changes, moving away from the printed object and purging nozzle, or other operations that mitigate the conditions. During or after mitigation procedures, parameters can be measured to confirm that thresholds are no longer exceeded. Once threshold levels are no longer in the danger zone, then normal printing operation can resume.

The threshold can be a combination of sensor and performance data, or can be pressure only. For example, detecting jams can be achieved by watching the pressure to see if it is steadily rising into a zone that has been pre-determined, with static testing of the polymer and hardware, that is considered to be approaching 80% of the max recorded pressure, which then indicates there is a high probability of a jam. At the same time, the rotary encoder can be monitored to check if the motor physically skips on the next command. Finally, in performance, one can look at the print from missing portions which designates a jam. In some implementations, prevention of a jam can be achieved by identifying when the pressure enters the 80% range of max, which will actively allow the operation to pause and relieve pressure outside the actions of printing. The ability to stop and restart the print like this—developed for changing filaments without ending the print—is called a hot pause.

In general, when pressure and filament motion do not match what is expected given the motor signals, this is indicative of a jam. A sudden drop in pressure, pressure that is consistently too high, or filament motion that lags behind the motor signal are also indicative of a jam. One or more of these indications can be included in the parameters profile and used to detect a jam. Further, in some implementations, generating the parameters profile includes specifying different retraction distances for the material (the amount of filament pull back when moving between a completed portion of a print to a next portion of the print) at different combinations of speed and temperature in accordance with detected pressure variations.

The generated profile is then output 435 for use in facilitating further 3D printing by the 3D printer using the material. For example, the generated profile can be stored in a persistent storage device for later loading and use. As another example, the generated profile can be set as input to another program for use by that other program. The generated profile can be used for validation and/or quality control monitoring for future 3D prints. Moreover, the generated profile can be used to detect deviation beyond one or more thresholds determined for identical 3D prints using the same material (on the same and/or another 3D printing machine) to indicate machine maintenance may be necessary or to indicate a possible problem with the material, e.g., a bad formulation, undesirable water content, filament size outside of specification, etc.

In addition, note that the described testing and profile generation can be performed for a known material or for a completely unknown material being used with the 3D printer. In the latter case, a new material can be fed into the 3D printer, and the testing procedure can determine the characteristics of the material and parameters needed to use it on the given 3D printer. Thus, the material (e.g., filament) can be an unknown, which the user of the 3D printer need not be worried about since the test procedure (using the sensor data) can gauge the 3D printer's response to the material and thereby guide the selection of printer parameters to use that material on the 3D printer.

Various test procedures are possible. In some implementations, each of multiple parameters (e.g., temperature or speed at which to operate the 3D printer) can be fixed while one or more other parameters are varied to detect issues. For example, the speed can be fixed, and the temperature can be varied until a pressure spike is observed, at which point, the test print can be stopped and then restarted at the next available speed and resetting back to the original temperature.

Figure 5A:
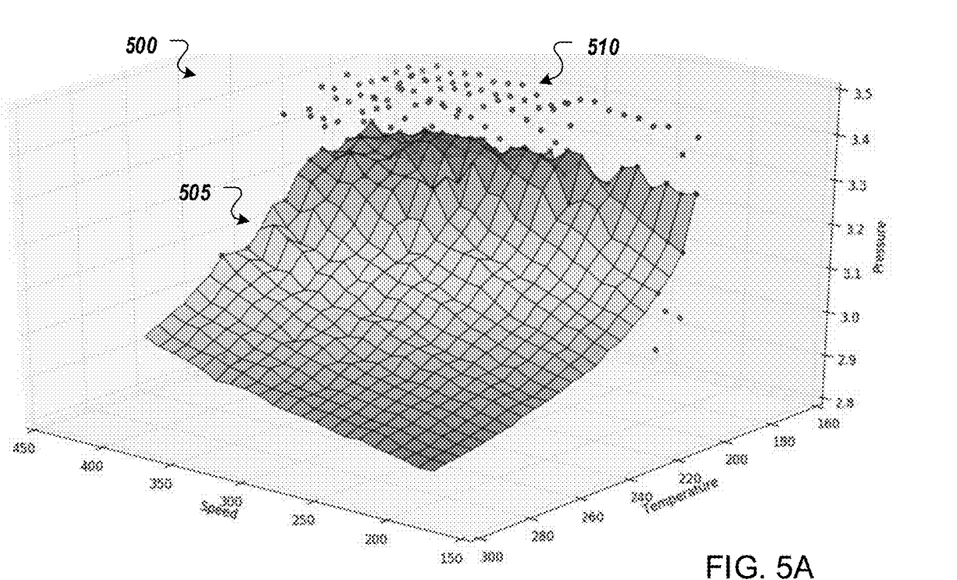
FIGS. 5A & 5B show examples of collected data used to generate a profile for a material extruded through a liquefier system.

FIG. 5A show an example of collected data 500 used to generate a profile for a material extruded through a liquefier system. As shown, the data 500 plots pressure value against both speed and temperature values. A connected surface 505 of the data 500 represents the acceptable ranges of speed and temperature for the given material, whereas the outlier data points 510 represent the pressure levels resulting from combinations of speed and temperature that are unacceptable. By deliberately creating multiple jams, the test procedure learns what combinations of print parameters lead to jams with the material in the 3D printer. Thus, the test procedure can identify what parameters are needed to run a particular filament through a particular liquefier system, without a priori knowledge of the material, by automatically determining the melt dynamics of the material in terms of pressure, speed and temperature.

Figure 5B:
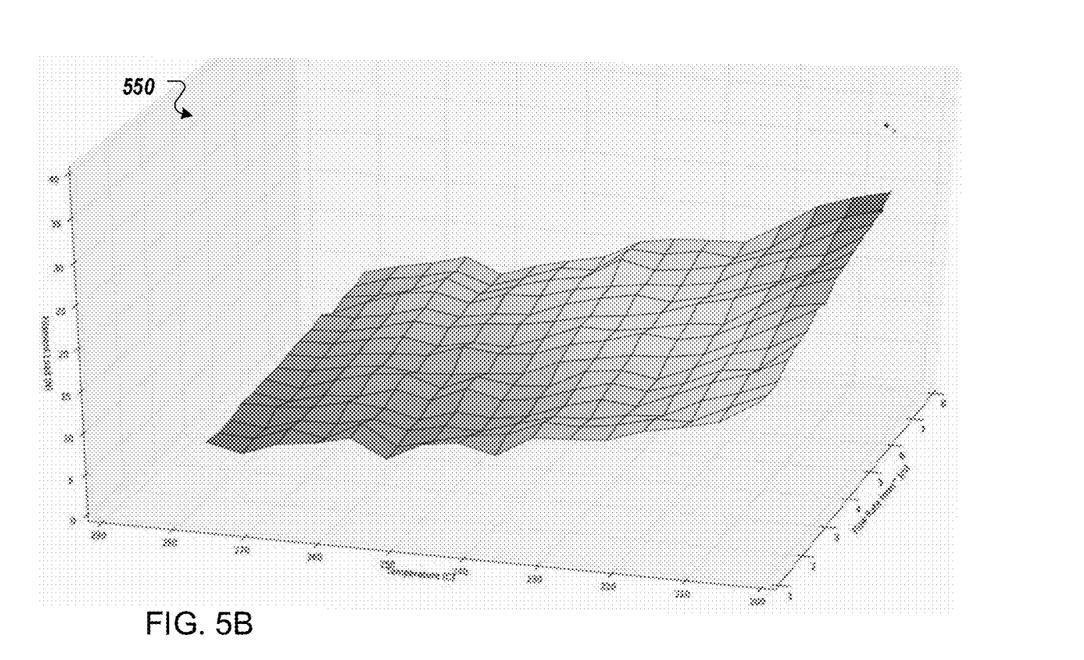

The data 500 in FIG. 5A is but one example. Multiple other combinations of data can be tested and analyzed. For example, FIG. 5B show an example of collected data 550 used to generate a profile for a material extruded through a liquefier system, where the data 550 plots the load on the filament (in Newtons) against temperature (in Celsius) and flow rate (in cubic millimeters per second). Other combinations are also possible.

Figure 6:
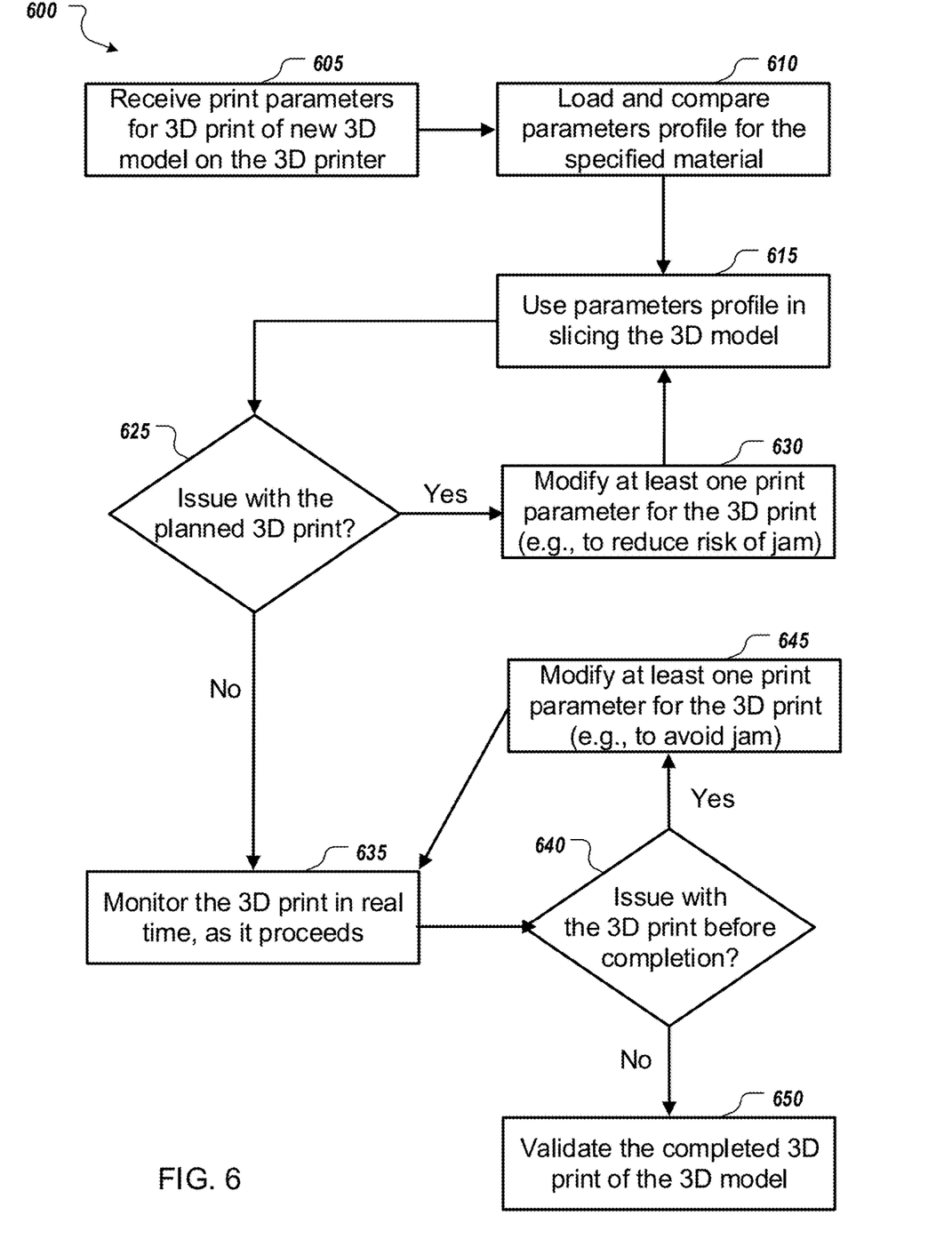
FIG. 6 shows an example of a process of checking a 3D print in accordance with a profile for a 3D print material used in the 3D print.

FIG. 6 shows an example of a process 600 of checking a 3D print in accordance with a profile for a 3D print material used in the 3D print. Print parameters are received 605 for a 3D print of a new 3D model on the 3D printer. For example, a user can select the print parameters to be used, and the parameters profile generated for the specified material to be used can be loaded into memory and compared 610 to identify any issues that may require adjustments. In some implementations, the print parameters are automatically selected 605 in accordance with the profile generated for the material to be used, selected by a user from a range of options specified by the profile, or both (e.g., defaults values that can be changed within a range). For example, a range of options can include an acceptable range [a-b] of feed rates for the material at each of multiple temperatures in a range [c-d] of acceptable temperatures, thus creating a multi-dimensional space of print parameters representing a range of safe working parameters for the material on the 3D printer.

In some implementations, the parameters profile is used 615 in slicing the 3D model to generate the tool path command codes for 3D printing. Note that the profile generation (using the data collected during standardized test prints) can identify scenarios that will likely fail on a given 3D printer with a given nozzle. For example, how many small extrusions, how small of an extrusion, or what combination of these can readily cause a jam. Thus, values on small extrusions for toolpaths can be included in the material profile, and this information can be used during the slicing 615 to inform the toolpath engine so as to avoid those scenarios. Note that the baseline pressure in the nozzle can increase or decrease over time depending on the combination of command codes being issued in sequence, and such information regarding how the pressure builds or drops over time (as determined from test prints) can be used in generating the sequence of commands for a new 3D model being sliced so as to avoid skips and jams. In some implementations, the small extrusions limit can be represented using a minimum amount of material to be pushed through the nozzle over a given time frame.

A check 625 can be made to see if there are any issues with the planned 3D print in view of the generated toolpath command codes and the profile for the material to be used. For example, the command codes for 3D printing can be input to a 3D print simulation software that also has information regarding the feed material and the type of 3D printer, etc., and the 3D print simulation software can perform at least some initial testing of the likely conditions to be seen in the 3D printer when processing the command codes, in accordance with the information stored in the properties profile for the given material on the given 3D printer. If there is an issue with the planned 3D print, at least one of the print parameters can be modified 630 (e.g., to reduce the risk of a jam during 3D printing) and the slicing 615 can be performed again.

When the process 600 is ready to proceed with a slice plan for the 3D print, in some implementations, the 3D print is monitored 635 in real time, as the 3D print proceeds. A real time closed loop sensor system can be employed in the 3D printer to monitor the sensors (e.g., the pressure sensor) and use this information to adjust the extruder motor (e.g., speed) in real time so as to ensure correct a flow rate. In some cases, this can replace pre-processed pressurization (referred to as Extruder Advance).

A check 640 can be made during the monitoring to see if any issues are developing during the ongoing 3D printing operations. For example, the process 600 can detect 640 that the chances of a jam are increasing. If an issue does develop, one or more of the print parameters can be modified 645 to address the issue. For example, the speed, flow rate, or both can be adjusted to avoid a jam during the 3D print. Additionally or alternatively, modifications can be made to the command codes on the fly to address the issue. For example, rather than adjusting the speed when a jam appears imminent, the 3D printer can be instructed to perform a purge 645 of the extruder (e.g., to a bucket or into an appropriate volume in the object being built) to reduce or eliminate the conditions leading to the expected jam (e.g., to normalize pressure levels). The timing of such a purge 645 can depend at least in part on the current set of printing operations being performed. For example, upon completion of a layer of a small feature, the build extrusion can be stopped to perform a purge before then starting the printing of another feature, which can assist in avoiding interruption of toolpaths.

In some implementations, verification can be performed (e.g., my monitoring sensor data coming from the 3D printer) to confirm that the purging 645 brings the 3D printer back to within acceptable ranges of operating states. In some cases, a report regarding the adjustment 645 and/or purge 645 that has taken place can be saved locally and/or sent to a remote data storage system; the report can include at least a portion of associated machine data concerning the 3D printer. In any case, while the 3D printer is running, the motor, temperature, material motion and pressure data can be monitored and analyzed in real time against the range of operating conditions expected in view of the test prints, and the result of this ongoing analysis can be used to modify the printing operations in real time.

Moreover, once a 3D print is completed, the collected data can be used to validate 650 the completed print. For example, by checking for inconsistency in the material flow rate, as reflected in the pressure data, between a current print and a previous print that had the same set of commands, a problem with a particular print in a batch can be identified. Collecting such data across multiple prints of the same 3D model (using similar 3D printer commands) allows the creation of upper and lower limits for the sensor data readouts, which can then be used to validate that a given print was successful when the sensor data readouts stay within these upper and lower limits. Since the expected ranges of the sensor data are known for various combinations of printer parameters and command codes, the system can detect whether the sensor data matched those expectations during a given 3D print in order to validate the print. On the other hand, significant deviations from the expected sensor data derived from different iterations of the same 3D print can indicate a print failure.

Similarly, in some implementations, the sensor data can be used to discover issues with the 3D printer as opposed to issues with a given 3D print. The collected data can be used to determine a baseline for the 3D printer, defining specific expected responses of the 3D printer to a given material when operated using specific components, such as firmware, software, or hardware (e.g., a particular nozzle). A check can then be made against this baseline to identify issues when one or more of those 3D printer components are changed.

The testing and 3D printing operations described can be performed by one or more programmable processors executing one or more computer programs encoded in a non-transitory medium to perform functions by operating on input data and generating output. Such one or more programmable processors executing one or more computer programs can be a 3D printer or extruder controller, or a separate computer system, which can be connected with the 3D printer by wired or wireless link, e.g., WiFi. A computer program (also known as a program, software, software application, script, or code) can be written in any form of programming language, including compiled or interpreted languages, declarative or procedural languages, and it can be deployed in any form, including as a stand-alone program or as a module, component, subroutine, or other unit suitable for use in a computing environment.

A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network. In addition, the processes that can be performed by computer programs can also be performed by, and apparatus can also be implemented as, special purpose logic circuitry, e.g., an FPGA (field programmable gate array) or an ASIC (application-specific integrated circuit).

While this specification contains many implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

Thus, particular embodiments of the invention have been described. Other embodiments are within the scope of the following claims. In addition, the actions recited in the claims can be performed in a different order and still achieve desirable results.

What is claimed is:

1. A method for determining dynamic forces in a liquefier system of an additive manufacturing (AM) three dimensional (3D) printer, the method comprising:

receiving motor data for a drive motor of the AM 3D printer that pushes a solid material toward a liquefaction zone of the liquefier system, wherein the motor data comprises at least one data point per individual command code of a set of command codes sent to the AM 3D printer;

receiving temperature data for the liquefaction zone of the liquefier system of the AM 3D printer, wherein the temperature data comprises at least one data point per individual command code of the set of command codes sent to the AM 3D printer;

receiving pressure data for the liquefaction zone of the liquefier system of the AM 3D printer, wherein the pressure data comprises at least one data point per individual command code of the set of command codes sent to the AM 3D printer;

analyzing the motor data, the temperature data, and the pressure data for the set of command codes sent to the AM 3D printer, wherein the analyzing comprises establishing an acceptable range of the pressure data for at least two different operating temperatures;

monitoring motor data, temperature data, and pressure data during manufacturing of a 3D object using the solid material with the AM 3D printer;

comparing the monitored pressure data from the AM 3D printer with the acceptable range of the pressure data in accordance with the monitored temperature data to detect an impending jam; and adjusting an aspect of the manufacturing of the 3D object using the solid material with the AM 3D printer to avoid the impending jam, wherein the adjusting comprises performing a purge of the solid material in the liquefier system to normalize pressure levels.

2. The method of claim 1, the method comprising:
sending the set of command codes to the AM 3D printer, wherein the set of command codes include command codes that vary a speed of deposition by the AM 3D printer in relation to a directed temperature for the liquefaction zone of the liquefier system;
wherein the analyzing comprises
monitoring the received pressure data during the variation of the speed in relation to the directed temperature, and
generating a parameters profile for the solid material used in the AM 3D printer; and
using the parameters profile for the solid material with further 3D printing by the AM 3D printer using the solid material.

3. The method of claim 2, wherein using the parameters profile comprises using the parameters profile in quality control monitoring of a future 3D print, indicating a potential need for maintenance of the 3D printer or a possible problem with the solid material, or a combination thereof.

4. The method of claim 2, wherein monitoring the received pressure data comprises detecting a pressure variation that indicates loss of material from the liquefaction zone during a transition from a first portion of 3D printing to a second portion of 3D printing, and generating the parameters profile comprises specifying different retraction distances for the solid material at different combinations of speed and temperature.

5. The method of claim 2, comprising receiving movement data for the solid material pushed toward the liquefaction zone of the liquefier system, wherein the movement data comprises at least one data point per individual command code of the set of command codes sent to the AM 3D printer, and wherein the analyzing comprises analyzing the movement data, the motor data, the temperature data, and the pressure data for the set of command codes sent to the AM 3D printer.

6. The method of claim 5, wherein monitoring the received pressure data comprises monitoring the received pressure data while detecting jams or skips made by the AM 3D printer based on a comparison of the motor data and the movement data for the solid material, and generating the parameters profile comprises specifying restrictions on available combinations of extrusion speed and directed temperature in order to prevent jams or skips during 3D printing by the AM 3D printer using the solid material.

7. The method of claim 2, wherein the parameters profile for the solid material used in the AM 3D printer comprises information regarding a minimum extrusion amount and a maximum number of small extrusions allowed within a set time or a set number of command codes, and using the parameters profile comprises using the minimum extrusion amount and the maximum number of small extrusions from the parameters profile as inputs to a slicer program that generates 3D printer command codes for a 3D model to be manufactured using the AM 3D printer.

8. The method of claim 1, the method comprising:
receiving movement data for the solid material pushed toward the liquefaction zone of the liquefier system of the AM 3D printer, wherein the movement data comprises at least one data point per individual command code of the set of command codes sent to the AM 3D printer;
wherein the analyzing comprises analyzing the movement data in addition to the motor data, the temperature data, and the pressure data, and the analyzing comprises establishing acceptable ranges of sensor output values for the 3D object to be manufactured using the solid material with the AM 3D printer, the acceptable ranges including the acceptable range of the pressure data;
wherein the monitoring comprises monitoring solid material movement data during the manufacturing of the 3D object using the solid material with the AM 3D printer;
comparing the monitored data from the AM 3D printer with the acceptable ranges of sensor output values, including the comparing the monitored pressure data;
identifying the 3D object as having been correctly manufactured using the solid material with the AM 3D printer when the monitored data from the AM 3D printer comes within the acceptable ranges of sensor output values; and
identifying a potential print failure for the 3D object manufactured using the solid material with the AM 3D printer when the monitored data from the AM 3D printer does not come within the acceptable ranges of sensor output values.

9. The method of claim 1, wherein the adjusting comprises changing a speed of the manufacturing of the 3D object.

10. A non-transitory computer-readable medium encoding instructions that cause a data processing apparatus associated with a liquefier system of an additive manufacturing (AM) three dimensional (3D) printer to perform operations comprising:
receiving motor data for a drive motor of the AM 3D printer that pushes a solid material toward a liquefaction zone of the liquefier system, wherein the motor data comprises at least one data point per individual command code of a set of command codes sent to the AM 3D printer;
receiving temperature data for the liquefaction zone of the liquefier system of the AM 3D printer, wherein the temperature data comprises at least one data point per individual command code of the set of command codes sent to the AM 3D printer;
receiving pressure data for the liquefaction zone of the liquefier system of the AM 3D printer, wherein the pressure data comprises at least one data point per individual command code of the set of command codes sent to the AM 3D printer;
analyzing the motor data, the temperature data, and the pressure data for the set of command codes sent to the AM 3D printer, wherein the analyzing comprises establishing an acceptable range of the pressure data for at least two different operating temperatures;
monitoring motor data, temperature data, and pressure data during manufacturing of a 3D object using the solid material with the AM 3D printer;
comparing the monitored pressure data from the AM 3D printer with the acceptable range of the pressure data in accordance with the monitored temperature data to detect an impending jam; and
adjusting an aspect of the manufacturing of the 3D object using the solid material with the AM 3D printer to avoid the impending jam, wherein the adjusting comprises performing a purge of the solid material in the liquefier system to normalize pressure levels.

11. The non-transitory computer-readable medium encoding instructions of claim 10, the operations comprising:
sending the set of command codes to the AM 3D printer, wherein the set of command codes include command codes that vary a speed of deposition by the AM 3D printer in relation to a directed temperature for the liquefaction zone of the liquefier system;
wherein the analyzing comprises
monitoring the received pressure data during the variation of the speed in relation to the directed temperature, and
generating a parameters profile for the solid material used in the AM 3D printer; and
using the parameters profile for the solid material with further 3D printing by the AM 3D printer using the solid material.

12. The non-transitory computer-readable medium encoding instructions of claim 11, wherein using the parameters profile comprises using the parameters profile in quality control monitoring of a future 3D print, indicating a potential need for maintenance of the 3D printer or a possible problem with the solid material, or a combination thereof.

13. The non-transitory computer-readable medium encoding instructions of claim 11, wherein monitoring the received pressure data comprises detecting a pressure variation that indicates loss of material from the liquefaction zone during a transition from a first portion of 3D printing to a second portion of 3D printing, and generating the parameters profile comprises specifying different retraction distances for the solid material at different combinations of speed and temperature.

14. The non-transitory computer-readable medium encoding instructions of claim 11, the operations comprising receiving movement data for the solid material pushed toward the liquefaction zone of the liquefier system, wherein the movement data comprises at least one data point per individual command code of the set of command codes sent to the AM 3D printer, and wherein the analyzing comprises analyzing the movement data, the motor data, the temperature data, and the pressure data for the set of command codes sent to the AM 3D printer.

15. The non-transitory computer-readable medium encoding instructions of claim 14, wherein monitoring the received pressure data comprises monitoring the received pressure data while detecting jams or skips made by the AM 3D printer based on a comparison of the motor data and the movement data for the solid material, and generating the parameters profile comprises specifying restrictions on available combinations of extrusion speed and directed temperature in order to prevent jams or skips during 3D printing by the AM 3D printer using the solid material.

16. The non-transitory computer-readable medium encoding instructions of claim 11, wherein the parameters profile for the solid material used in the AM 3D printer comprises information regarding a minimum extrusion amount and a maximum number of small extrusions allowed within a set time or a set number of command codes, and using the parameters profile comprises using the minimum extrusion amount and the maximum number of small extrusions from the parameters profile as inputs to a slicer program that generates 3D printer command codes for a 3D model to be manufactured using the AM 3D printer.

17. The non-transitory computer-readable medium encoding instructions of claim 10, the operations comprising:
receiving movement data for the solid material pushed toward the liquefaction zone of the liquefier system of the AM 3D printer, wherein the movement data comprises at least one data point per individual command code of the set of command codes sent to the AM 3D printer;
wherein the analyzing comprises analyzing the movement data in addition to the motor data, the temperature data, and the pressure data, and the analyzing comprises establishing acceptable ranges of sensor output values for the 3D object to be manufactured using the solid material with the AM 3D printer, the acceptable ranges including the acceptable range of the pressure data;
wherein the monitoring comprises monitoring solid material movement data during the manufacturing of the 3D object using the solid material with the AM 3D printer;
comparing the monitored data from the AM 3D printer with the acceptable ranges of sensor output values, including the comparing the monitored pressure data;
identifying the 3D object as having been correctly manufactured using the solid material with the AM 3D printer when the monitored data from the AM 3D printer comes within the acceptable ranges of sensor output values; and
identifying a potential print failure for the 3D object manufactured using the solid material with the AM 3D printer when the monitored data from the AM 3D printer does not come within the acceptable ranges of sensor output values.

18. The non-transitory computer-readable medium encoding instructions of claim 10, wherein the adjusting comprises changing a speed of the manufacturing of the 3D object.

* * * * *